(12) United States Patent
Minch

(10) Patent No.: US 6,944,553 B2
(45) Date of Patent: Sep. 13, 2005

(54) SYSTEMS, METHODS AND COMPUTER PROGRAM PRODUCTS FOR PROVIDING COMMUNICATIONS CABLE TEST DATA TO REMOTELY LOCATED CLIENTS

(75) Inventor: Scott Jeffrey Minch, Hickory, NC (US)

(73) Assignee: CommScope Properties, LLC, Sparks, NV (US)

( * ) Notice: Subject to any disclaimer, the term of this patent is extended or adjusted under 35 U.S.C. 154(b) by 180 days.

(21) Appl. No.: 10/427,840

(22) Filed: May 1, 2003

(65) Prior Publication Data

US 2004/0220756 A1 Nov. 4, 2004

(51) Int. Cl.[7] ............................................. G01R 31/00
(52) U.S. Cl. .......................... 702/58; 702/108; 701/33; 379/1.04; 379/29.01; 324/539; 324/66
(58) Field of Search ..................... 702/58, 108; 701/33; 379/1.04, 29.01; 324/539, 66

(56) References Cited

U.S. PATENT DOCUMENTS 5,812,531 A * 9/1998 Cheung et al. ............. 370/255
6,442,498 B1 * 8/2002 Krigel ......................... 702/108

OTHER PUBLICATIONS

Horowitz and Hill, The Art of Electronics, Cambridge University Press, 1989, p. 456.*

* cited by examiner

Primary Examiner—Michael Nghiem
Assistant Examiner—Stephen J. Cherry
(74) Attorney, Agent, or Firm—Myers Bigel Sibley & Sajovec

(57) ABSTRACT

Systems, methods, and computer program products are provided that can facilitate providing test data for communications cables to remotely located customers. A customer accesses a server of a cable manufacturer via a client program executing on a client device. The server accepts entry of identification information for a communications cable (e.g., a unique identifier printed on the cable at predetermined intervals) via the remotely located client device. The server retrieves test data for the communications cable based on the entered information and provides the retrieved test data to the client device.

23 Claims, 8 Drawing Sheets

TO FIGURE 6B

SYSTEMS, METHODS AND COMPUTER PROGRAM PRODUCTS FOR PROVIDING COMMUNICATIONS CABLE TEST DATA TO REMOTELY LOCATED CLIENTS

RESERVATION OF COPYRIGHT

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

FIELD OF THE INVENTION

The present invention relates generally to data transmission cabling and, more particularly, to systems, methods, and computer program products for providing information relating to data transmission cabling.

BACKGROUND OF THE INVENTION

With the ever-increasing demands for higher data transmission rates, there are ever-increasing demands from local area network (LAN) cable customers for high-speed data transmission characteristics. LAN cable customers are increasingly demanding assurance that LAN cables will perform at operational levels that equal or exceed certain transmission performance standards, such as transmission requirements for cables qualifying as Category 5, Category 5e or Category 6 cables under TIA/EIA-568A. LAN cables include twisted pair cables, coaxial cables and optical fiber cables.

Cable manufacturers may provide written performance test data with each batch or reel of cable. Unfortunately, this practice may increase costs to the cable manufacturers and may be somewhat time consuming. Moreover, written performance test data oftentimes becomes lost prior to or during installation. As such, cable customers oftentimes request the cable manufacturers to resend this data to them. This practice can be time consuming and can increase costs to cable manufacturers.

SUMMARY OF THE INVENTION

In view of the above discussion, embodiments of the present invention provide systems, methods, and computer program products that can facilitate providing test data for communications cables to remotely located customers, typically prior to installation of the communications cables. According to embodiments of the present invention, a customer accesses a server of a cable manufacturer via a client program executing on a client device (e.g., a Web browser executing on a client device). The server accepts entry of identification information for a communications cable (e.g., a unique identifier printed on the cable at predetermined intervals, or on a reel or other package, etc.) via the remotely located client device. The server retrieves test data for the communications cable based on the entered information and provides the retrieved test data to the client device. The customer can view the test data, save the test data and/or print the test data.

Embodiments of the present invention may be advantageous to both cable manufacturers and cable customers, alike. Cable manufacturers can reduce costs associated with providing test performance data with each reel of cable. Moreover, customers can have easy access to test performance data from virtually any location. Embodiments of the present invention can be used for any type of cable including, but not limited to, coaxial cable, twisted pair cable, optical fiber cable, and hybrids thereof.

DETAILED DESCRIPTION OF THE INVENTION

Figure 1:
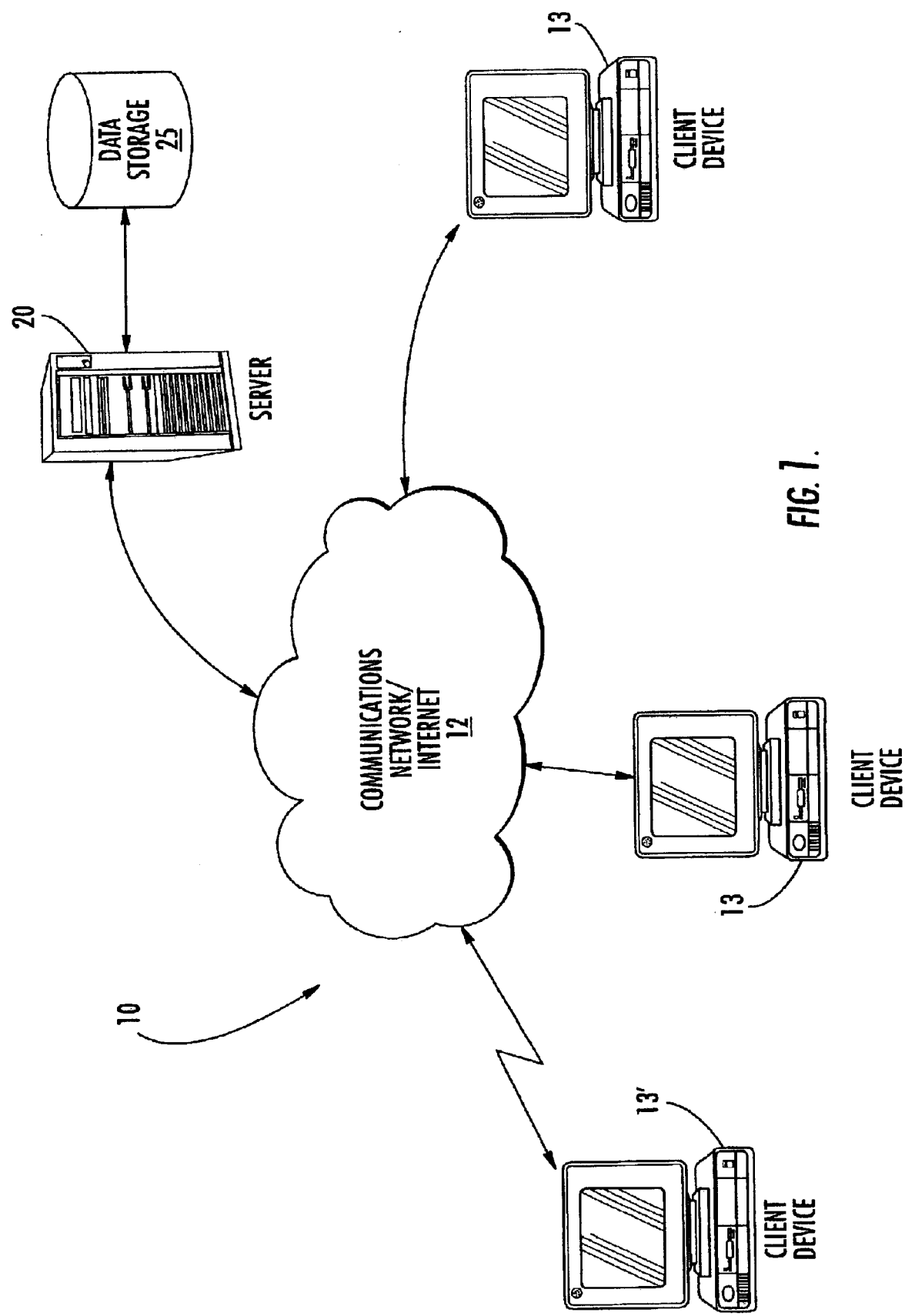
FIG. 1 is a schematic illustration of a system that can facilitate providing test data for communications cables from cable manufacturers to remotely located customers according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In overview, embodiments of the present invention relate to providing test data for communications cables to remotely located customers, typically prior to installation of the communications cables. As used herein, the term "communications cable" includes any type of cable used in communications networks including, but not limited to, coaxial cable, twisted pair cable, optical fiber cable, and hybrids thereof.

As will be appreciated by one of skill in the art, the present invention may be embodied as methods, data processing systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including, but not limited to, hard disks, CD-ROMs, optical storage devices, and magnetic storage devices.

Computer program code for carrying out operations of the present invention may be written in an object oriented programming language such as JAVA®, Smalltalk or C++. The computer program code for carrying out operations of the present invention may also be written in conventional procedural programming languages, such as "C", or in various other programming languages. Software embodiments of the present invention do not depend on implementation with a particular programming language. In addition, portions of program code may execute entirely on one or more data processing systems.

The present invention is preferably practiced within a client/server programming environment. As is known by those skilled in this art, client/server is a model for a relationship between two computer programs in which one program, the client program, makes a service request from another program, the server program, which fulfills the request. Relative to the Internet, a Web browser is a client program that requests services (the sending of Web pages or files) from a Web server (which technically is called a Hypertext Transport Protocol or HTTP server) in another computer somewhere on the Internet.

As is known to those with skill in this art, client/server environments may include public communications networks, such as the Internet, and private communications networks often referred to as "intranets" and "extranets." The term "Internet" shall incorporate the terms "intranet" and "extranet" and any references to the Internet shall be understood to mean a communications network of any type, including intranets and/or extranets.

FIG. 1 illustrates an exemplary system 10 for facilitating providing test data for communications cables from cable manufacturers to remotely located customers according to embodiments of the present invention. The illustrated system 10 includes a server 20 that is connected to a communications network 12 (e.g., the Internet, an intranet, etc.), a plurality of client devices 13, 13' that are also connected to the communications network 12, and data storage 25. Exemplary customer client devices 13, 13' may include, but are not limited to, personal computers, wireless communications devices, personal digital assistants (PDAs), hand-held computers, Internet-ready phones, and WebTVs. Customer client devices according to embodiments of the present invention may be directly connected to the communications network 12 (e.g., client device 13) or may communicate with the communications network 12 wirelessly (e.g., client device 13'). The server 20 is configured to implement at least the operations described below with respect to FIG. 3.

Figure 2:
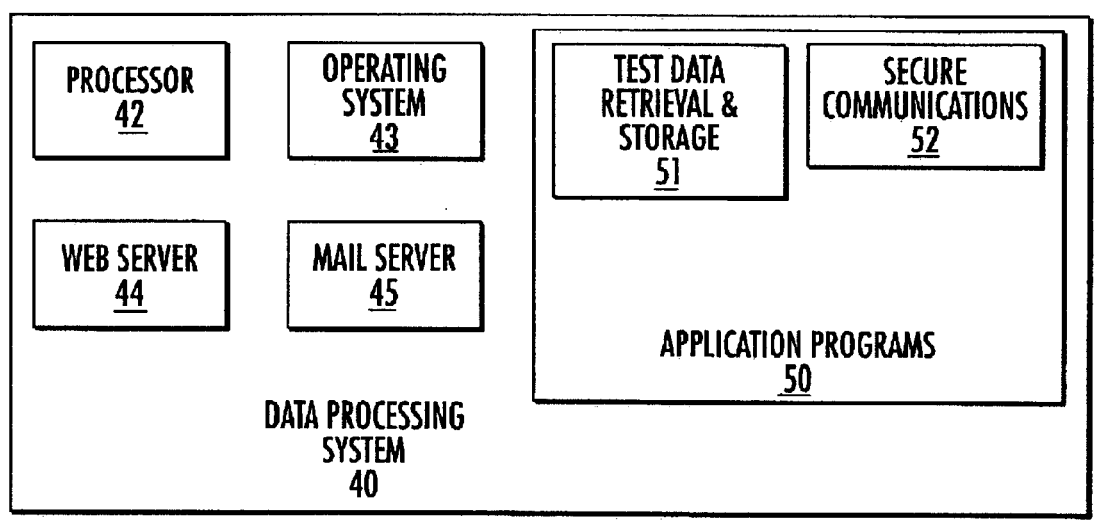
FIG. 2 is a block diagram of a data processing system for use in implementing the server of FIG. 1.

Referring to FIG. 2, a block diagram of a data processing system 40 that may be used to implement the server 20 (FIG. 1), according to embodiments of the present invention, is illustrated. The illustrated data processing system 40, includes a processor 42, an operating system 43, a web server 44, a mail server 45, and various application programs 50: test data retrieval and storage 51 and secure communications (e.g., encrypted data communications) 52. These applications 50 may execute entirely on the server 20 (or on other data processing systems in communication with the server 20), or partly on the server 20 and partly on a customer's client device 13.

The test data retrieval and storage application 51 is configured to accept entry of identification information for a particular communications cable and retrieve test data for the identified communications cable. Test data for communications cables produced by the cable manufacturer are stored in, and retrieved from, one or more databases in communication with the server 20. However, other data storage technologies may be utilized without limitation. As is known by those of skill in the art, a database is a collection of data that is organized in "tables." A database typically includes a database manager that facilitates accessing, managing, and updating data within the various tables of a database. Exemplary types of databases that can be used as data storage 25 to implement embodiments of the present invention include, but are not limited to, relational databases, distributed databases (databases that are dispersed or replicated among different points in a network), and object-oriented databases. Relational, distributed, and object-oriented databases are well understood by those of skill in the art and need not be discussed further herein. Exemplary commercial databases that can be used to implement embodiments of the present invention include, but are not limited to, IBM's DB2® database, Microsoft's SQL server database, and other database products, such as those from Oracle, Sybase, and Computer Associates.

The secure communications application 52 is optional and is configured to allow cable manufacturers to communicate with customers in a secure environment.

Exemplary data processing systems which may be utilized in accordance with embodiments of the present invention include, but are not limited to, SUN MICROSYSTEMS®, APPLE®, IBM®, and IBM®-compatible personal computers and workstations. However, it is to be understood that various computing devices and processors may be utilized to carry out embodiments of the present invention without being limited to those enumerated herein. Exemplary operating systems 43 may include, but are not limited to, LINUX®, UNIX, WINDOWS 98®, WINDOWS 2000®, WINDOWS XP® and WINDOWS NT® operating systems, and PALM OS® and WINDOWS CE® operating systems for handheld devices.

The Web server 44 is configured to handle communications with client devices 13, 13' (FIG. 1) and other devices that are in communication with the communications network 12. Web servers are well understood by those of skill in the art, and need not be described further herein. Exemplary Web servers that may be utilized in accordance with embodiments of the present invention include Apache, available from the Apache Server Project (www.apache.org); Microsoft's Internet Information Server (IIS), available from Microsoft Corporation, Redmond, Wash.; and Netscape's FastTrack® and Enterprise™ servers, available from America Online, Inc., Dulles, Va. Other Web servers that may be utilized include, but are not limited to, Novell's Web Server for users of its NetWare® operating system, available from Novell, Inc., San Jose, Calif.; and IBM's family of Lotus Domino® servers, available from International Business Machines Corporation, Armonk, N.Y.

The mail server 45 is optional and is configured to send e-mail messages to customers via the communications network 12. For example, retrieved cable data may be provided to a client device via e-mail. E-mail delivery of cable data may be in lieu of, or in addition to, display within a client device. Mail servers are well understood by those of skill in the art, and need not be described further herein. Embodiments of the present invention may utilize various types of mail servers. For example, mail servers that send and receive mail, such as the "Sendmail" server utilized by UNIX systems, or "Exchange" server utilized by Microsoft NT® systems, may be utilized.

The present invention will now be described below with reference to block diagrams and/or flowchart illustrations of methods, apparatus (systems) and computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

It should be noted that, in some alternative embodiments of the present invention, the functions noted in the blocks may occur out of the order noted in the figures, or not at all. For example, two blocks shown in succession may in fact be executed substantially concurrently or the blocks may sometimes be executed in the reverse order, depending on the functionality involved. Furthermore, in certain embodiments of the present invention, such as object oriented programming embodiments, the sequential nature of the flowcharts may be replaced with an object model such that operations and/or functions may be performed in parallel or sequentially.

Figure 3:
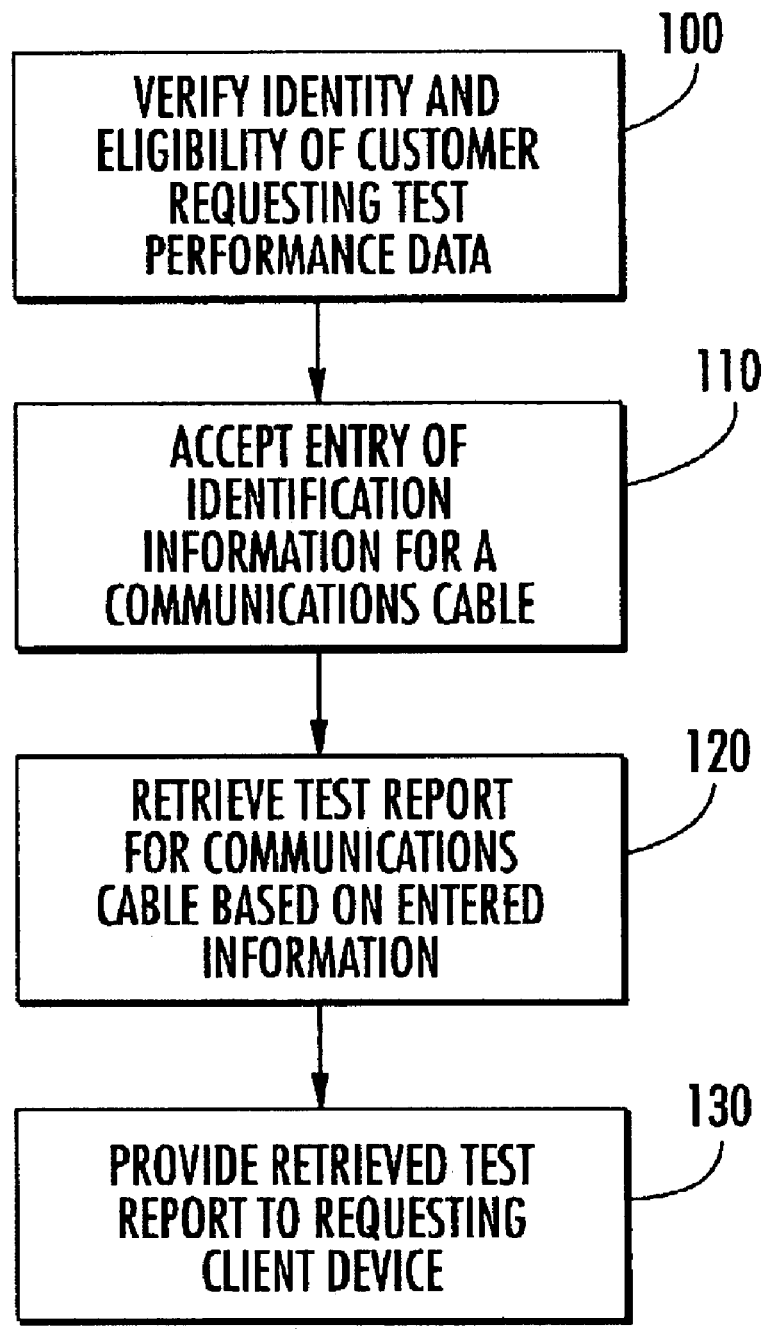
FIG. 3 is a flow chart of systems, methods and/or computer program products that can facilitate providing test data for communications cables from cable manufacturers to remotely located customers according to embodiments of the present invention.

Referring now to FIG. 3, a flow chart of systems, methods and/or computer program products for providing test data for communications cables to remotely located customers, according to embodiments of the present invention, will now be described. Initially, a customer, who wishes to receive test data about a particular batch of communications cable, logs on to the server 20 (FIG. 1) via a client device 13, 13'. As used herein the term "customer" is intended to mean any third party such as an individual or business. Moreover, the term "customer" is not limited to an individual or business who purchased a communications cable from a particular manufacturer. The term "customer" is intended to mean any third party that requests test data about a particular communications cable.

Figure 4:
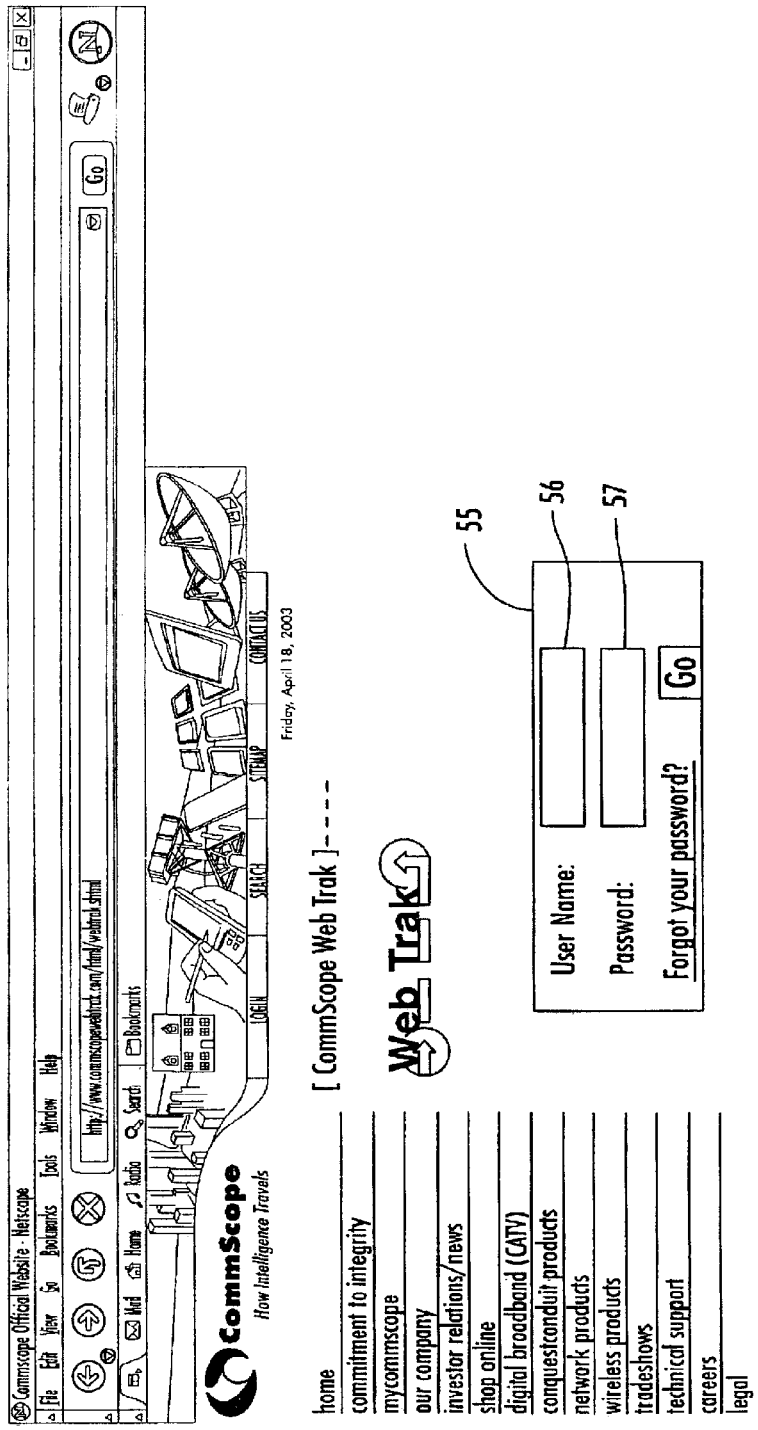
FIG. 4 illustrates an exemplary log-on screen for the Web site of a communications cable manufacturer.

As an optional first step, the server 20 verifies the identity of a customer requesting test data and verifies that the customer is eligible to receive this test data (Block 100). The server 20 may be configured to verify the identify of the customer in various ways. This may be done, for example, by comparing location information of the customer logging on with known customer information, by comparing identification information of the customer logging on with known customer identification information, etc. Other exemplary means for verifying the identity of a customer include, but are not limited to, password and ID, public key infrastructure mechanisms and techniques, biometrics, smart cards, etc. FIG. 4 illustrates an exemplary user interface 55 containing user name and password fields 56, 57 for use in logging on to server 20.

Once it has been determined that the requesting customer is eligible to receive the requested test data, the server 20 accepts entry of identification information for a communications cable (Block 110). Cable identification information may include a unique identifier printed on the cable at predetermined intervals or on a reel or other package.

Figure 5:
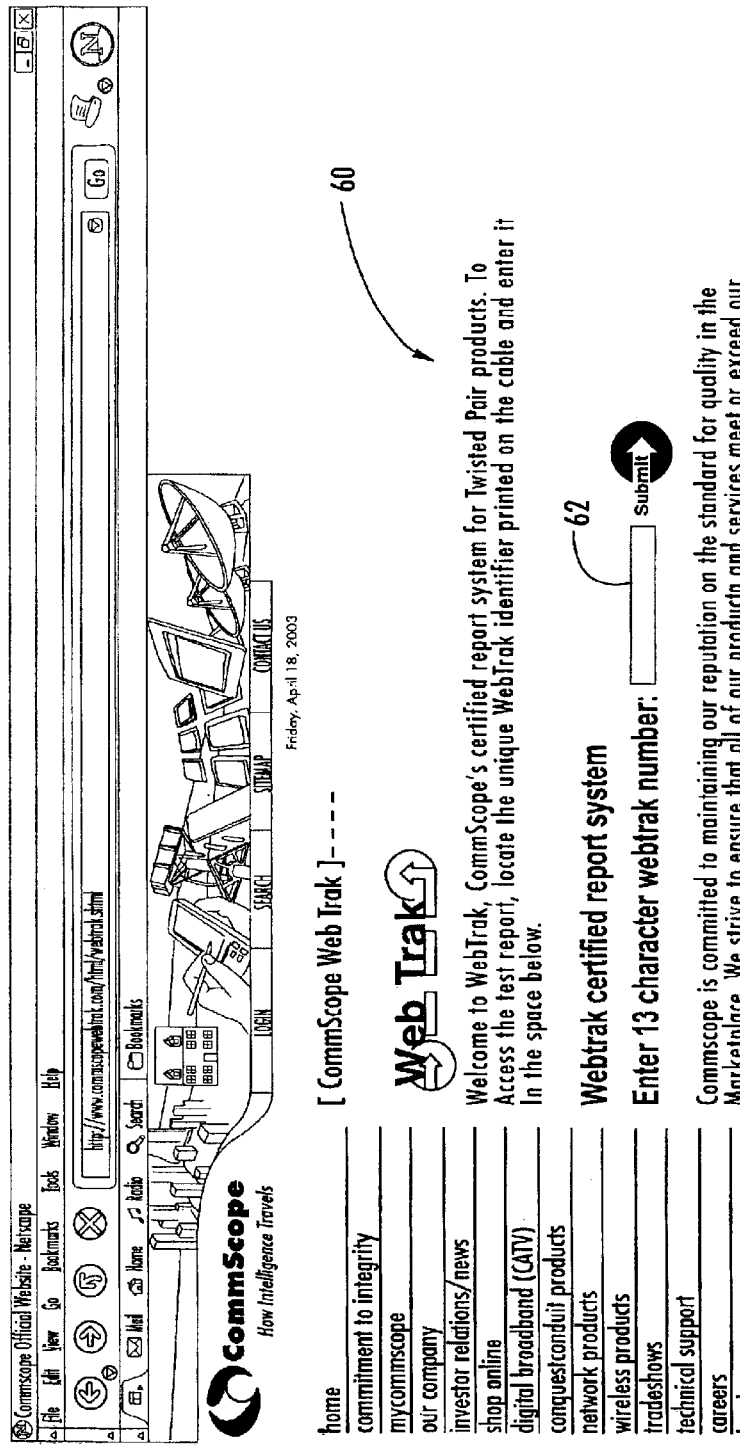
FIG. 5 illustrates an exemplary user interface for entering identification information for a communications cable, according to embodiments of the present invention.

FIG. 5 illustrates an exemplary client device user interface 60 that includes a data entry field 62 for entering identification information for a communications cable, according to embodiments of the present invention. In such embodiments, the identification information may be required to be entered in a predetermined, structured format (e.g., BR36141-GE166), or in an unstructured format (e.g., br36141ge166).

Figure 6A:
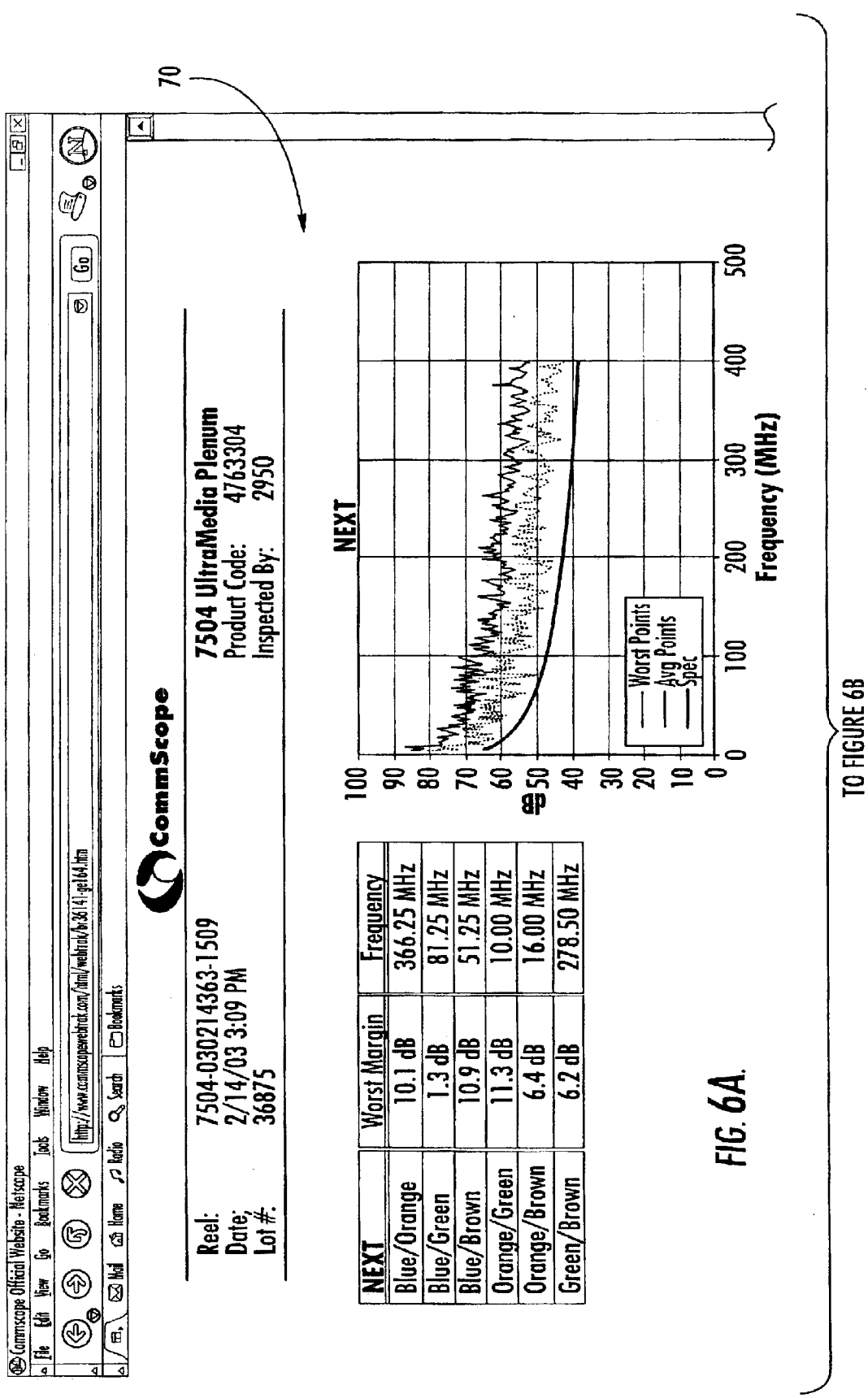
FIGS. 6A–6C illustrate an exemplary report containing test data for an identified communications cable.
Figure 6B:
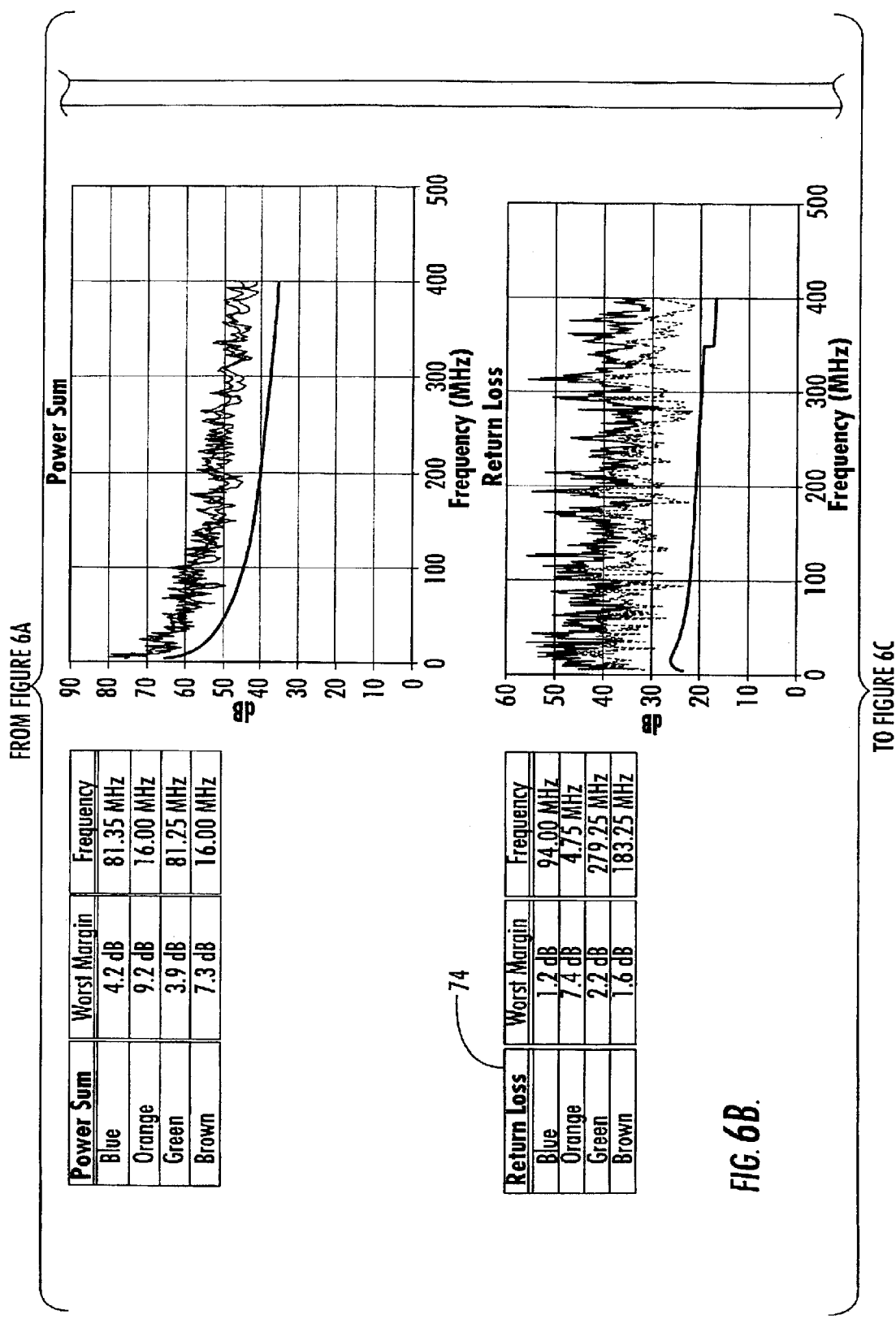
Figure 6C:
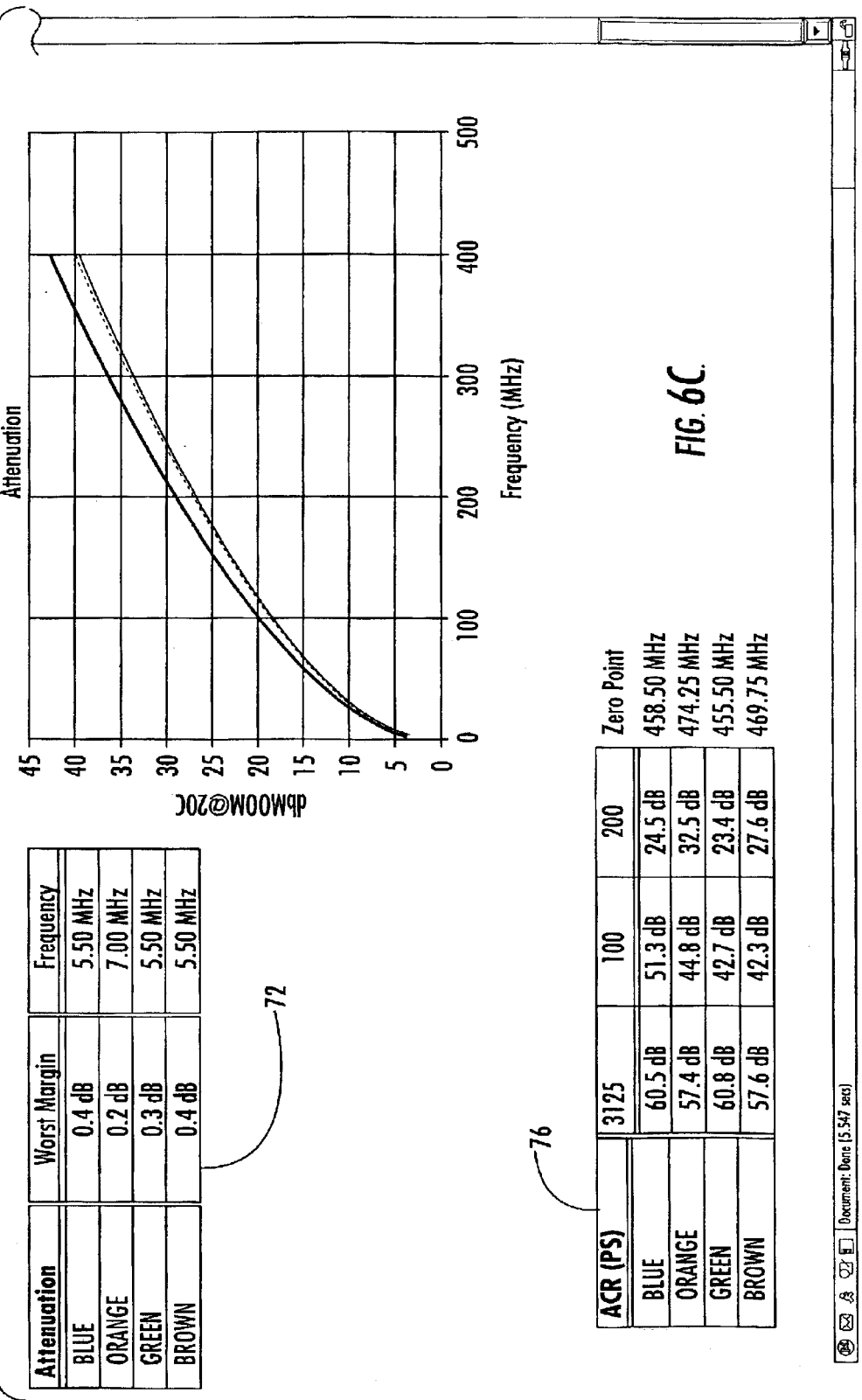

The server 20 retrieves test data for the communications cable based on the entered information (Block 120), and provides the retrieved test data to the requesting client device (Block 130). The customer can view the data, save the data and/or print the data, as would be understood by those skilled in the art. FIGS. 6A–6C illustrate an exemplary report 70 containing test data for an identified communications cable that was retrieved in accordance with embodiments of the present invention. In the illustrated report 70, test data for the data communication cable includes attenuation data 72, return loss data 74, ACR data 76, and NEXT data. NEXT is an abbreviation for Near-End CrossTalk and is a measurement of noise propagation between neighboring pairs in a twisted-pair cable construction (generally measured in dB). ACR is an abbreviation for Attenuation/Crosstalk Ratio and is, mathematically, the ratio of attenuation to crosstalk at a given frequency (generally measured in dB). This is the amount by which the signal exceeds the noise and is often loosely termed "headroom."

Embodiments of the present invention are not limited to the illustrated report 70. Various types of test data may be provided and may be arranged in various ways, without limitation. For example, other product performance data that could be included in a report includes, but is not limited to, far-end crosstalk (FEXT), equal level far-end crosstalk (ELFEXT), power sum near-end crosstalk (PSNEXT), characteristic impedance, structural return loss (SRL), DC resistance (DCR), skew, velocity of propagation, resistance, resistance unbalance, mutual capacitance and capacitance unbalance. Optical fiber cable test reports may include data such as attenuation, point defects, bandwidth, Polarization Mode Dispersion (PMD) and fiber geometry measurements.

A report supplied to a customer could also include information such as customer information, product data, manufacture and test data and physical data. Exemplary customer data may include, but is not limited to, customer name and address, order number, customer (or OEM) part number, etc. Exemplary product data may include, but is not limited to, catalog number, product code, product description, color, construction, smoke and flame ratings, performance specifications, etc. Exemplary manufacture and test data may include, but is not limited to, manufacture date, inspector number, temperature, relative humidity, etc. Exemplary physical data may include, but is not limited to, cable length, center conductor diameter, dielectric diameter, shield diameter, jacket diameter, jacket wall thickness, fiber diameter, dielectric strength, excess fiber length (EFL), eccentricity, ovality, etc.

It is understood that embodiments of the present invention are not limited to the various screens described and illustrated herein. Various screens and other user interfaces can be utilized in accordance with embodiments of the present invention.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of providing test data for communications cables to remotely located customers, the method comprising the following performed by a data processing system:

accepting entry of a unique identifier for a batch of communications cable, wherein the unique identifier is entered via a remotely located client device in communication with the data processing system;

retrieving test data for the communications cable based on the entered unique identifier, wherein the test data comprises response performance data for the communications cable; and providing the retrieved test data to the client device.

2. The method of claim 1, wherein the unique identifier is printed on the cable at predetermined intervals.

3. The method of claim 1, wherein the client device is in communication with the data processing system via a communications network.

4. The method of claim 3, wherein the communications network comprises the Internet.

5. The method of claim 3, wherein the communications network comprises a wireless communications network.

6. The method of claim 1, wherein the communications cable is selected from the group consisting of coaxial cable, twisted pair cable, optical fiber cable, and hybrids thereof.

7. The method of claim 1, wherein the information is entered in a predetermined, structured format.

8. The method of claim 1, further comprising the following performed prior to accepting entry of identification information:

identifying an entity entering the information; and verifying that the entity is authorized to view the test data for the communications cable.

9. The method of claim 1, wherein the response performance data for the data communication cable comprises data selected from the group consisting of return loss data, ACR data, near-end crosstalk data, far-end crosstalk data, equal level far-end crosstalk data, power sum near-end crosstalk data, characteristic impedance data, structural return loss data, DC resistance data), skew data, velocity of propagation data, resistance data, resistance unbalance data, mutual capacitance data and capacitance unbalance data.

10. A method of providing test data for communications cables to remotely located customers, the method comprising the following performed by a data processing system:

accepting entry of identification information for a communications cable, wherein the entered information comprises a unique identifier for a batch of communications cable printed on the cable at predetermined intervals, and wherein the identification information is entered via a remotely located client device in communication with the data processing system via a communications network;

retrieving test data for the communications cable based on the entered information, wherein the test data comprises attenuation data, return loss data and ACR data for the communications cable; and providing the retrieved test data to the client device.

11. The method of claim 10, wherein the communications network comprises the Internet.

12. The method of claim 10, wherein the communications network comprises a wireless communications network.

13. The method of claim 10, wherein the communications cable is selected from the group consisting of coaxial cable, twisted pair cable, optical fiber cable, and hybrids thereof.

14. The method of claim 10, wherein the information is entered in a predetermined, structured format.

15. The method of claim 10, further comprising the following performed prior to accepting entry of identification information:

identifying an entity entering the information; and verifying that the entity is authorized to view the test data for the communications cable.

16. A data processing system that provides test data for communications cables to remotely located customers, comprising:

means for accepting entry of identification information for a communications cable, wherein the entered information comprises a unique identifier printed on the cable at predetermined intervals, and wherein the identification information is entered via a remotely located client device in communication with the data processing system via a communications network;

means for retrieving test data for the communications cable based on the entered information, wherein the test data comprises data selected from the group consisting of return loss data, ACR data, near-end crosstalk data, far-end crosstalk data, equal level far-end crosstalk data, power sum near-end crosstalk data, characteristic impedance data, structural return loss data, DC resistance data, skew data, velocity of propagation data, resistance data, resistance unbalance data, mutual capacitance data and capacitance unbalance data; and means for providing the retrieved test data to the client device.

17. The data processing system of claim 16, wherein the communications network comprises the Internet.

18. The data processing system of claim 16, wherein the communications network comprises a wireless communications network.

19. The data processing system of claim 16, further comprising the following performed prior to accepting entry of identification information:

identifying an entity entering the information; and verifying that the entity is authorized to view the test data for the communications cable.

20. A computer program product that provides test data for communications cables to remotely located customers, the computer program product comprising a computer usable storage medium having computer readable program code embodied in the medium, the computer readable program code comprising:

computer readable program code that accepts entry of identification information for a communications cable, wherein the entered information comprises a unique identifier printed on the cable at predetermined intervals, and wherein the identification information is entered via a remotely located client device in communication with the data processing system via a communications network;

computer readable program code that retrieves test data for the communications cable based on the entered information, wherein the test data comprises data selected from the group consisting of return loss data, ACR data, near-end crosstalk data, far-end crosstalk data, equal level far-end crosstalk data, power sum near-end crosstalk data, characteristic impedance data, structural return loss data, DC resistance data, skew data, velocity of propagation data, resistance data, resistance unbalance data, mutual capacitance data and capacitance unbalance data; and computer readable program code that provides the retrieved test data to the client device.

21. The computer program product of claim 20, wherein the communications network comprises the Internet.

22. The computer program product of claim 20, wherein the communications network comprises a wireless communications network.

23. The computer program product of claim 20, further comprising:

computer readable program code that identifies an entity entering the information; and computer readable program code that verifies that the entity is authorized to view the test data for the communications cable.

* * * * *